Oct. 11, 1949.  C. A. ATWELL  2,484,007
SLOT WEDGE FOR DYNAMOELECTRIC MACHINES
Filed July 26, 1947

WITNESSES:
Robert C Baird
Nw. C. Groove

INVENTOR
Clarence A. Atwell.
BY O.R.Buchanan
ATTORNEY

Patented Oct. 11, 1949

2,484,007

UNITED STATES PATENT OFFICE 2,484,007

SLOT WEDGE FOR DYNAMOELECTRIC MACHINES

Clarence A. Atwell, Pittsburgh, Pa., assignor to Westinghouse Electric Corporation, East Pittsburgh, Pa., a corporation of Pennsylvania Application July 26, 1947, Serial No. 763,884

12 Claims. (Cl. 171—252)

My invention relates to wedges which are used for retaining coils in the slots of direct-current dynamo armatures, and other dynamo-electric machines.

In the very earliest days of dynamo-electric machines, solid metal wedges, of either magnetic or non-magnetic material, were used or proposed, but this practice was quickly abandoned, in favor of insulated wedges, because of the high eddy-current loss in the solid metal material. Since then, slot-closing wedges have been consistently made of insulating material, except in some cases where magnetic material was introduced for the purpose of producing or approaching the effect of a completely closed slot, and in such cases, the magnetic material was introduced in either the form of powdered magnetic material, held together with a binder, or laminated material with the laminations running in the same direction as the armature-laminations, that is, in planes normal to the shaft of the machine. In the armatures of most modern direct-current machines, which is the field in which my invention is more particularly applicable, magnetic material is not desired in the slot-closing wedges, because such material would provide an easy fluxpath, across the top of the slot, which would produce increased commutation sparking-volts between the commutator-bars under a brush.

An object of my invention is to provide a non-magnetizable wedge having non-magnetic metal punchings or laminations which provide a good heat-conducting path, from the armature-conductors which lie in the slot, to the cylindrical surface of the armature, thus providing a much better conduction of the heat-loss in the armature-conductors, without magnetically closing the slots.

A further object of my invention is to provide a laminated slot-closing wedge in which the laminations run lengthwise of the wedge, and at right angles to the armature-punchings or laminations.

A still further object of my invention is to provide a laminated wedge in combination with a layer of insulating material, for insulating the wedge both from the armature-conductors and from the two sides of the slot in which the wedge is placed.

Figure 1:
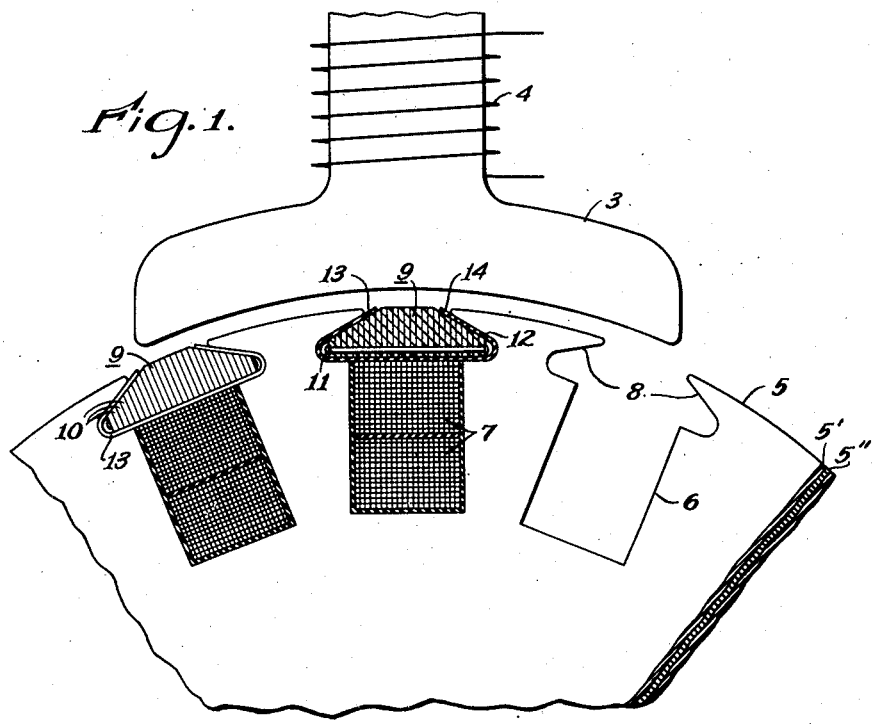
Figure 2:
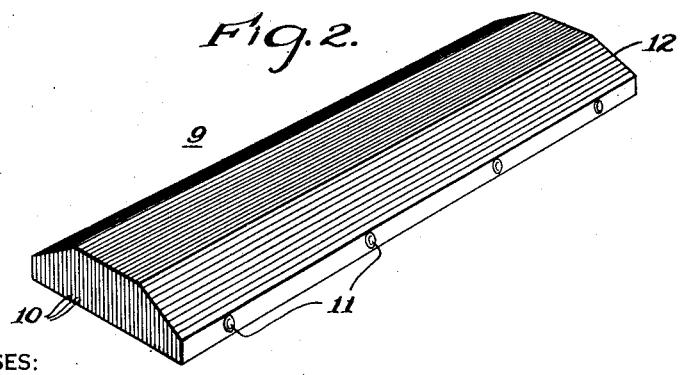

With the foregoing and other objects in view, my invention consists in the apparatus, combinations, parts and methods of design and operation, hereinafter described and claimed, and illustrated in the accompanying drawing, wherein:

Figure 1 is a fragmentary diagrammatic view of a part of a direct-current machine embodying my invention, and showing the laminated armature-member in transverse section, and Fig. 2 is a perspective view of my slot-closing wedge.

In the drawing, I have shown my invention as being applied to a direct-current dynamo having a stator-member and a rotor-member. The stator-member is diagrammatically represented by only one pole-piece 3, having a field-coil 4 thereon, although it will be understood that there are usually a plurality of poles which are distributed about the rotor-member. The rotor-member is indicated as comprising a substantially cylindrical magnetizable core 5, which is universally of laminated mangetizable material, as indicated by the successive laminations 5' and 5", shown at the right of Fig. 1. This rotor-core 5 has winding-receiving slots 6 in which are disposed the armature-conductors 7. The tops of the slots 6 are provided with the usual wedge-receiving grooves 8, one on each side of each slot, and wedges 9 are driven from end to end into these wedge-grooves 8 to mechanically close the top of each slot, and hold, in the slot, the coil-sides of the armature-conductors 7.

In accordance with my present invention, each of the wedges 9 is made up of a stack of metal punchings 10 which extends in substantially radial planes running lengthwise of the wedge, and hence parallel to the axis of the machine. Also, in accordance with my present invention, these wedge-punchings are made of laminated non-magnetic sheet-steel, or other substantially non-magnetizable metal, or other substantially non-magnetizable material having good electrical and thermal conductivities. The wedge-punchings 10 can either be stacked directly in contact with each other, with no other insulation between punchings than is provided by the ordinarily present surface-oxide films or surface-irregularities which make for poor electrical contact between successive laminations, or more formal insulation may be provided, as by the use of suitable insulating varnishes, or other surface-coverings, such as are known in the art of making the laminated armature-cores 5. The wedge-laminations 10 are held in stacked relation by means of a plurality of bolts 11 or equivalent means. The edges of the wedges 9 are machined or otherwise shaped, as shown at 12, to fit the wedge-grooves 8 of the slots.

It is a desirable feature of my invention to provide, in connection with the wedges 9, a trough-shaped wedge-cell 13, which may be made of a sheet or layer of thin tough insulating-material which can be placed in the wedge-grooves 8 before driving the wedge 9 into place, so that, in the finished machine, the insulating material of the wedge-cell 13 has a central portion which underlies the wedge, insulating it from the armature-conductors 7, and two edge-portions which are squeezed between the edges of the wedge 9 and the wedge-grooves 8. This insulating cell 13 is trimmed at the armature-surface 14 after the wedge is driven into place.

As a result of my construction, I have provided a metallic slot-wedge which has the advantage of reducing the temperature of the armature-conductors 7, by better carrying away the heat-losses which are generated therein, without closing the slot magnetically or electrically. The wedge-cell 13 also provides ample electrical insulation between the wedge and the armature-conductors, while at the same time preventing the short-circuiting of the armature-punching or laminations 5', 5'' by the edges of the wedge, and also preventing other damage to the armature-punchings while the wedge is being driven into place.

While I have illustrated my invention in connection with the armature-member of a direct-current dynamo-electric machine, it will be obvious that the invention is of general applicability to other laminated core-members of any other kind of dynamo-electric machine in which the core-members are provided with winding-receiving slots, and in which the windings are retained in the slots by means of slot-closing wedges.

I claim as my invention:

1. A dynamo-electric machine having a laminated magnetizable core having winding-receiving slots, a winding having coil-sides disposed in said slots, and slot-closing wedges for closing said slots, each wedge comprising a plurality of punchings having reasonably good electric and thermal conductivities, said punchings extending lengthwise of the wedge and substantially radially with respect to the axis of the machine, and means extending transversely with respect to the wedge for holding the wedge-punchings in a compressed stack-formation.

2. A dynamo-electric machine having a laminated magnetizable core having winding-receiving slots, a winding having coil-sides disposed in said slots, and slot-closing wedges comprising stacks of substantially non-magnetic punchings having reasonably good electrical and thermal conductivities, said punchings extending in planes which are substantially radial with respect to the axis of the machine.

3. A dynamo-electric machine having a laminated magnetizable core having winding-receiving slots, a winding having coil-sides disposed in said slots, and slot-closing wedges for closing said slots, each wedge comprising a plurality of metal punchings extending lengthwise of the wedge and substantially radially with respect to the axis of the machine, and means extending transversely with respect to the wedge for holding the wedge-punchings in a compressed stack-formation.

4. A dynamo-electric machine having a laminated magnetizable core having winding-receiving slots, a winding having coil-sides disposed in said slots, and slot-closing wedges comprising stacks of substantially non-magnetic metal punchings extending in planes which are substantially radial with respect to the axis of the machine.

5. The invention as defined in claim 1, in combination with a separate trough-shaped layer of insulating material associated with each wedge and having a central portion underlying the wedge, and two side portions interposed between the wedge and its slot.

6. The invention as defined in claim 2, in combination with a separate trough-shaped layer of insulating material associated with each wedge and having a central portion underlying the wedge, and two side portions interposed between the wedge and its slot.

7. The invention as defined in claim 3, in combination with a separate trough-shaped layer of insulating material associated with each wedge and having a central portion underlying the wedge, and two sides portions interposed between the wedge and its slot.

8. The invention as defined in claim 4, in combination with a separate trough-shaped layer of insulating material associated with each wedge and having a central portion underlying the wedge, and two side portions interposed between the wedge and its slot.

9. A slot-closing wedge for a dynamo-electric machine, said wedge comprising a plurality of punchings having reasonably good electrical and thermal conductivities, said punchings extending lengthwise of the wedge and substantially radially with respect to the axis of the machine, and means extending transversely with respect to the wedge for holding the wedge-punchings in a compressed stack-formation.

10. A slot-closing wedge for a dynamo-electric machine, said wedge comprising a stack of substantially non-magnetic punchings having reasonably good electrical and thermal conductivities, and means for holding said punchings in stacked relation.

11. A slot-closing wedge for a dynamo-electric machine, said wedge comprising a plurality of metal punchings extending lengthwise of the wedge and substantially radially with respect to the axis of the machine, and means extending transversely with respect to the wedge for holding the wedge-punchings in a compressed stack-formation.

12. A slot-closing wedge for a dynamo-electric machine, said wedge comprising a stack of substantially non-magnetic metal punchings, and means for holding said punchings in stacked relation.

CLARENCE A. ATWELL.

REFERENCES CITED

The following references are of record in the file of this patent:

UNITED STATES PATENTS

| Number | Name | Date |
|---|---|---|
| 790,471 | Wright | May 23, 1905 |
| 990,964 | De Kaiser | May 2, 1911 |
| 1,150,022 | Field | Aug. 17, 1915 |
| 2,320,866 | Hill | June 1, 1943 |